United States Patent [19]

Heppke et al.

[11] Patent Number: 4,826,620
[45] Date of Patent: May 2, 1989

[54] CHIRAL PHENOLIC ESTERS OF MESOGENIC CARBOXYLIC ACIDS AND THEIR USE AS ADMIXTURE IN LIQUID CRYSTAL PHASES

[75] Inventors: Gerd Heppke; Detlef Lötzsch; Feodor Oestreicher; Günter Scherowsky, all of Berlin, Fed. Rep. of Germany

[73] Assignee: Hoechst Aktiengesellschaft, Frankfurt am Main, Fed. Rep. of Germany

[21] Appl. No.: 144,789

[22] Filed: Jan. 21, 1988

Related U.S. Application Data

[63] Continuation of Ser. No. 912,361, Sep. 26, 1986, abandoned.

[30] Foreign Application Priority Data

Sep. 30, 1985 [DE] Fed. Rep. of Germany ....... 3534780
Feb. 17, 1986 [DE] Fed. Rep. of Germany ....... 3604901

[51] Int. Cl.$^4$ .................... C09K 19/52; C09K 19/34; C09K 19/32; G02F 1/13
[52] U.S. Cl. .................... 252/299.61; 252/299.62; 252/299.01; 350/350 R; 350/350 S; 534/566; 534/567; 534/577; 544/316; 544/318; 544/296; 544/298; 544/332; 544/335; 549/370; 549/371; 549/372; 549/373; 549/375; 560/1; 560/35; 560/59; 560/66; 560/78; 560/102; 560/126; 560/116; 560/86; 560/108; 560/125; 560/118
[58] Field of Search .......... 252/299.5, 299.61, 299.62, 252/299.01; 350/350 S, 350 R; 534/566, 567, 577; 544/316, 318, 296, 298, 332, 335; 549/370, 371, 372, 373, 375; 560/1, 35, 59, 66, 73, 86, 102, 108, 126, 116, 118, 125

[56] References Cited

U.S. PATENT DOCUMENTS

| | | | |
|---|---|---|---|
| 4,264,148 | 4/1981 | Gobl-Wunsch et al. ....... | 350/350 R |
| 4,454,057 | 6/1984 | Kaneko et al. ................. | 252/299.62 |
| 4,457,828 | 7/1984 | Lewis ............................. | 252/299.62 |
| 4,650,600 | 3/1987 | Heppke et al. ................. | 252/299.01 |

FOREIGN PATENT DOCUMENTS

| | | |
|---|---|---|
| 0138006 | 4/1985 | European Pat. Off. . |
| 2827471 | 1/1980 | Fed. Rep. of Germany ... 350/350 R |
| 3333677 | 4/1985 | Fed. Rep. of Germany ......... 252/299.61 |
| 1603075 | 11/1981 | United Kingdom . |

OTHER PUBLICATIONS

Heppke et al., CA 106:41948r (1987).
Miyano et al., CA 101:230097 v (1984).
Byung Wook Jo et al., Makromolekular Chemie Rapid Comm., vol. 3, pp. 23–27 (1982).
Gottarelli et al., Journal of Organic Chemistry, vol. 51, No. 5, pp. 589–592 (1986).

*Primary Examiner*—Teddy S. Gron
*Assistant Examiner*—J. E. Thomas
*Attorney, Agent, or Firm*—Curtis, Morris & Safford

[57] ABSTRACT

The new esters derived from a chiral compound containing two OH groups and at least one mesogenic carboxylic acid which have the general formula (I)

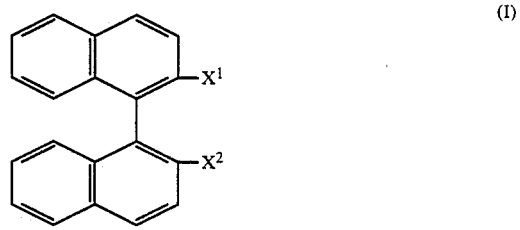

(I)

in which $X^1$=O—H or O—CO—($C_1$ to $C_{12}$)alkyl and $X^2$=O—MC or $X^1$ and $X^2$ denote O-MC independently of each other, where MC is the molecular radical of a mesogenic monocarboxylic acid after splitting off an OH group.

The esters or esters substituted in the aromatic part of the phenolic part preferably find application as an admixture intwistable liquid crystal phases in which they produce a temperature compensation and a high degree of twisting.

5 Claims, 3 Drawing Sheets

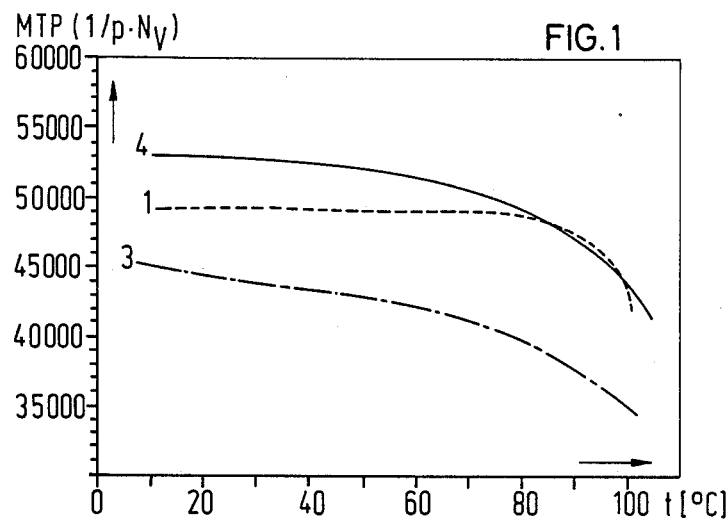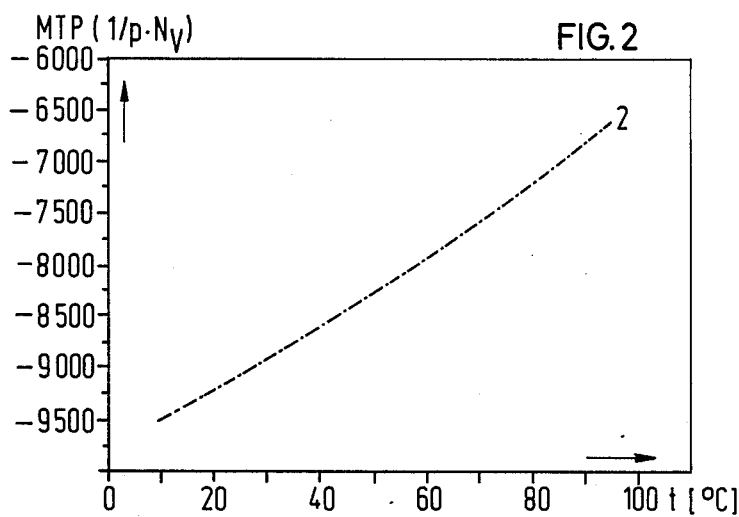

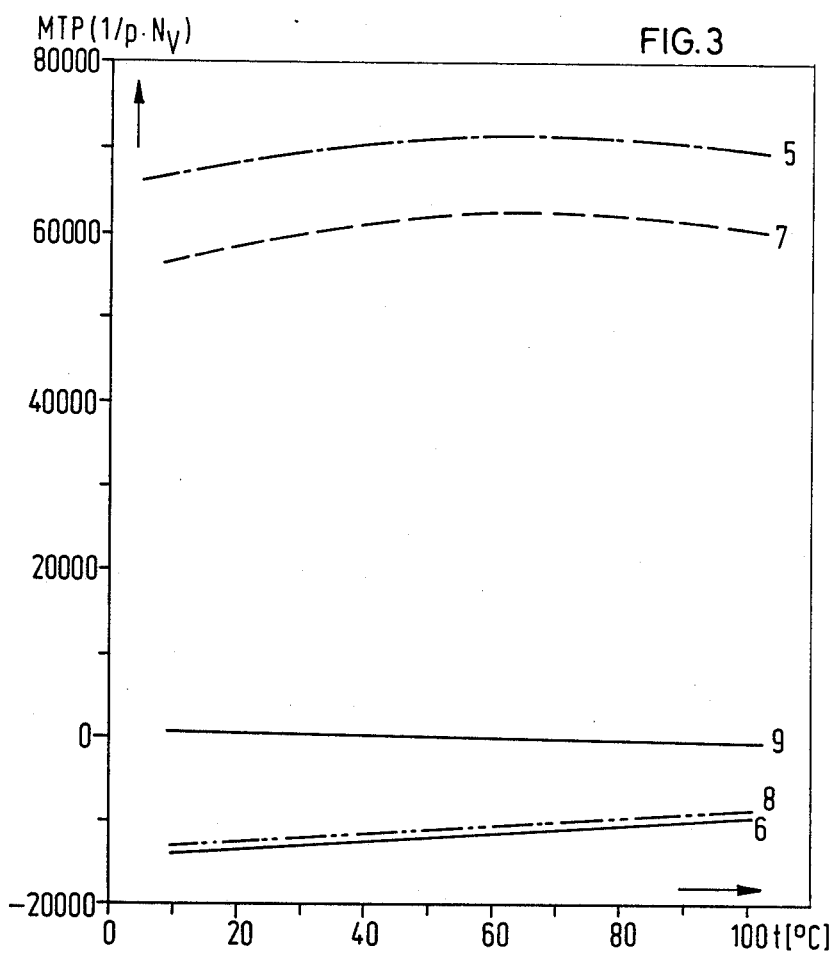

CHIRAL PHENOLIC ESTERS OF MESOGENIC CARBOXYLIC ACIDS AND THEIR USE AS ADMIXTURE IN LIQUID CRYSTAL PHASES

This application is a continuation of application Ser. No. 912,361, filed Sept. 26, 1986, now abandoned.

In general, the characteristics of the electrooptical effects employed in liquid crystal displays vary with temperature. In particular, with a multiplex drive this results in difficulties which may lead to an undesirable limitation of the working temperature range. In the case of various electrooptical effects, for instance in the case of the cholesteric/nematic phase transformation effect, the TN ("twisted nematic") cell and the recently introduced SBE ("supertwisted birefringence effect"), the temperature dependence of the electrooptical characteristics can be advantageously influenced by adding chiral compounds to the nematic liquid crystal as a result of the variation with temperature of the pitch of the cholesteric helical structure induced thereby. The usual known admixtures in general induce a pitch which rises with increasing temperature; recently admixtures have also been described which not do exhibit this often undesirable effect.

The addition of two different chiral admixtures to nematic carrier substances is known from DE-C-2,827,471 (U.S. Pat. No. 4,264,148); in this case one chiral admixture produces a right-handed twist in the nematic carrier substance, the other a left-handed twist. A reduction in pitch is achieved with an admixture of this type, but the achievement of this effect requires relatively high total concentrations which may result in the other material parameters being effected negatively.

In DE-A-3,333,677 reaction product (esters) of chiral butane-2,3-diol with mesogenic carboxylic acids are described inter alia, which can simplify the optimizing of the temperature compensation even with single admixturing the liquid crystal phases. However, these known esters often have a twisting power which is still too low for certain applications. According to data in said DE-A, the "pc product", which corresponds to the reciprocal value of the twisting power, is 9.2 to 116 $\mu$m·% by weight.

The object of the invention is therefore to find new compounds which, when they are used as chiral dopants in liquid crystal phases, effect an optimization of the temperature compensation and simultaneously a high twisting of the induced helical structures with the addition of relatively small quantities.

The starting point of the invention is a known ester of a chiral compound with two OH groups and at least one mesogenic carboxylic acid. The inventive compounds are compounds having the general formula (I)

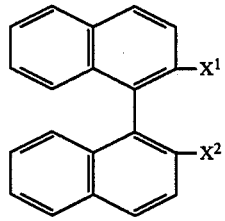

(I)

in which $X^1$=O—H or O—CO—($C_1$ to $C_{12}$) alkyl and $X^2$=O—MC or $X^1$ and $X^2$ denote O-MC independently of each other, MC being the molecular radical of a mesogenic monocarboxylic acid after splitting off an OH group. The general formula (I) covers the R and S configurations.

In another of its aspects, the present invention is directed to a twistable liquid crystal phase containing at last one chiral compound wherein the phase contains at least one compound of the general formula (I) or a phenolic ester (corresponding to said general formula (I) as an unsubstituted basic molecule) substituted in the aromatic part of the phenolic part as the chiral compound. By the term "twistable liquid crystal phase" are meant nematic, cholesteric, "tilted" smectic, in particular smectic C ($S_c$ or SmC) phases.

The inventive twistable liquid crystal phases comprise 2 to 20, preferably 2 to 15 components, including at least one of the chiral admixtures claimed according to the invention. The other components are preferably selected from the known compounds having nematic, cholesteric and/or tilted smectic phases, which include, for example, Schiff's bases, biphenyls, terphenyls, phenylcyclohexanes, cyclohexylbiphenyls, pyrimidines, cinnamic acid esters, cholesterol esters, variously bridged, terminally polar polynuclear esters of p-alkylbenzoic acids. In general, even before the addition of the chiral admixture the liquid crystal phases obtainable commercially exist as mixtures of a wide variety of components, at least one of which is mesogenic, i.e. as a compound, in the form of a derivative or mixed with certain co-components exhibits a liquid crystal phase [makes it possible to expect at least one enantiotropic (clear point>melting point) or monotropic (clear point<melting point) mesophase formation].

By means of the newly developed compounds as an admixture it is possible to achieve a high degree of twisting in liquid crystal phases with a small amount of admixture some compounds having, in addition, a substantially independent pitch with change in temperature, i.e. the increase or decrease of pitch is in general in the region of 1% to 1°/$_{oo}$ per K. The product p·c (p=pitch of the induced helix structure in $\mu$m, c=concentration of the chiral admixture in % by weight) is smaller than 5, and is preferably between 0.5 and 4, in particular in the case of the compounds in which $X^1$ and $X^2$ denote O—MC. A further application is possible in thermotopography or in producing "blue phases" (cholesteric systems with a relatively small pitch of, for example, less than 800 nm). In general, the monoesterified compounds induce a different helical direction of rotation (twisting) than the diesterified compounds (negative compared with positive values) but, in the case of the diesters, helix inversion may also occur under certain conditions, this being the case in particular for those diesters in which $X^1$ denotes O—CO—($C_1$ to $C_{12}$) alkyl and $X^2$ denotes O—MC. Among the compounds of the general formula (I) those compounds are preferred in which the radical MC [expressed by the general formula (II)] denotes $$R—(A^1—)_{n1}(B—)_{n2}(A^2—)_{n3}CO \qquad (II)$$

in which the symbols have the following meaning:
R=a straight-chain or branched ($C_1$-$C_{12}$)alkyl, where one or two nonadjacent $CH_2$ groups may be replaced by 0 atoms, or if n1=1, also F, Cl, Br or CN,
$A^1$, $A^2$=independently of each other, 1,4-phenylene, pyrimidine-2,5-diyl, 1,4-cyclohexylene, 1,3-dioxane-2,5-diyl, 1,3-dithiane-2,5-diyl or 1,4-bicyclo[2.2.2]octylene, where these groups may also be at least singly substituted by F, Cl, Br, CN and/or $(C_1-C_{12})$alkyl (one or two nonadjacent $CH_2$ groups may optionally be replaced by 0 atoms),

B=CO—O, O—CO, $CH_2$—$CH_2$, $OCH_2$, $CH_2O$, CH=N, N=CH, N=N, N(O)=N, n1, n2, n3=independently of each other, 0, 1 or 2, n1 and n3 not being 0 at the same time.

Among the compounds those compounds are again preferred in which the symbols have the following meaning: R=straight-chain $(C_4-C_{10})$alkyl, where one $CH_2$ group may be replaced by an O atom, $A^1$, $A^2$=independently of each other, unsubstituted 1,4-phenylene or 1,4-cyclohexylene, B=CO—O, O—CO, n1=1 n2=0 or 1, n3=1 or 2 $X^1$ and $X^2$=O—MC.

The liquid crystal phases contain in general 0.01 to 70% by weight, in particular 0.05 to 50% by weight, of the inventive admixture (s).

EXAMPLES AND COMPARISON EXAMPLES

Examples 1 and 2

10 to 40 mg of dimethylaminopyridine and 1.5 mmol of the mesogenic carboxylic acid are added to 1 mmol of the R-1,1'-bi-2-naphthol in 10 to 50 ml of anhydrous methylene chloride or dimethylformamide while stirring. 1.5 mmol of dicyclohexylcarbodiimide are added at a temperature of 0° C. and stirring is carried out at this temperature for 10 minutes and then for 20 h at room temperature. Precipitated urea is filtered off, the filtrate is boiled down in vacuum and the residue which remains is taken up in methylene chloride. After any filtration necessary, the organic solvent is distilled off and the residue is chromatographed using silica gel (the structure of the compounds is confirmed by spectrographic data and elementary analyses).

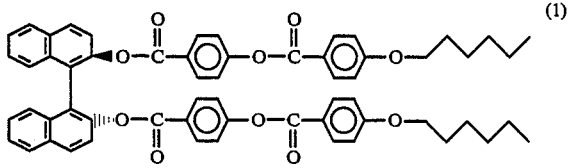

(1)

R-1,1'-bi-2-naphthol diester of 4-(4-n-hexyloxybenzoyloxy)benzoic acid

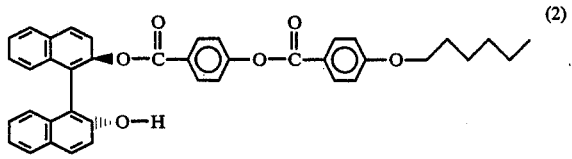

(2)

R-1,1'-bi-2-naphthol monoester of 4-(4-n-hexyloxybenzoyloxy)benzoic acid

The compound (1) has a melting point of °C. and the twisting power (expressed as p.c) varies from 1.9 to 2.2 between 10° and 100° C. The compound (2) has a melting point of 128° C. and the twisting power varies from −6 to −9. The measurement of the twisting power is carried out in a commercial nematic wide-range mixture designated "RO-TN 404" manufactured by Hoffmann-La Roche Aktiengesellschaft (Basel, Switzerland) having a clear point of 104° C.

EXAMPLES 3 AND 4

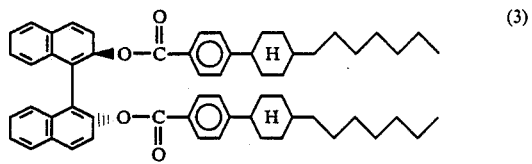

(3)

R-1,1'-Bi-2-naphthol diester of 4-(trans-4-n-heptylcyclohexyl)benzoic acid 100 mmol of $SOCl_2$ are added to 10 mmol of the mesogenic 4-(trans-4-n-heptylcyclohexyl)benzoic acid. 5 drops of pyridine are added and the reaction mixture is heated under reflux for 2 h. The excess $SOCl_2$ is distilled off. The acid chloride produced is dissolved in pyridine. The optically active 1,1'-bi-2-naphthol is slowly added in equimolar quantity to the solution and, on adding a spatula tip of dimethylaminopyridine, the reaction mixture is then heated under reflux for 20 h. The mixture is filtered, the solution is boiled down and purified wit a silica gel acid. According to the analytical data (elementary analysis, NMR spectrum, IR spectrum) the recrystallized product fits the formula (3) indicated.

The compound (4) below is synthesized correspondingly.

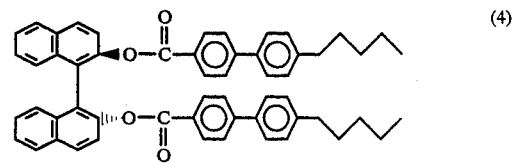

(4)

R-1,1'-Bi-2-naphthol diester of 4'-n-pentyl-4-diphenhlcarboxylic acid

COMPARISON EXAMPLE

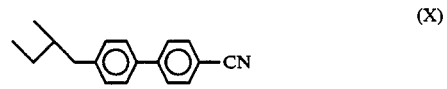

(X)

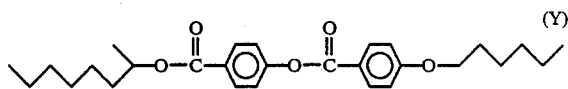

(Y)

One each of the compounds (3) and (4), and for comparison one each of the compounds (X) and (Y), are added to the wide-range mixture "RO-TN 404"; the comparison compounds are the commercial chiral admixtures "CB 15" manufactured by BDH (British Drug House), Poole (GB) and "S 811" manufactured by E. Merck, Darmstadt (Germany). The degree of twisting in μm·% by weight (=p·c) (specified at a temperature of 25° C.) and the temperature dependence of the pitch in $°/_{oo}$ per K. are determined in this liquid crystal phase.

| Compound | p · c (μm · % by weight at 25° C.) | Temperature dependence ($°/_{oo}$ per K) |
| --- | --- | --- |
| 3 | +1.95 | 1 |
| 4 | +1.50 | 1 |
| X | +14 | 4 |

-continued

| Compound | p·c (μm · % by weight at 25° C.) | Temperature dependence (°/∞ per K) |
|---|---|---|
| Y | −8.5 | 2 |

EXAMPLES 5 TO 9

The procedure is as specified in Examples 1 and 2, but the acid component is varied; in the case of Example 9, in addition to the usual mesogenic acid component, a ($C_2$ to $C_{13}$)alkanoic acid is caused to react:

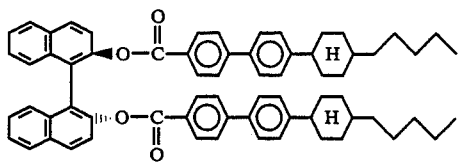
(5)

R-1,1'-bi-2-naphthol diester of 4'-trans-n-pentylcyclohexyl-4-diphenylcarboxylic acid

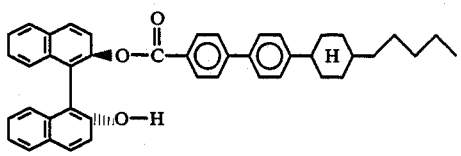
(6)

R-1,1'-bi-2-naphthol monoester of 4'-trans-n-pentylcyclohexyl-4-diphenylcarboxylic acid

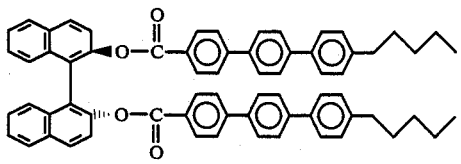
(7)

R-1,1'-bi-2-naphthol diester of 4''-n-pentyl-4-terphenylcarboxylic acid

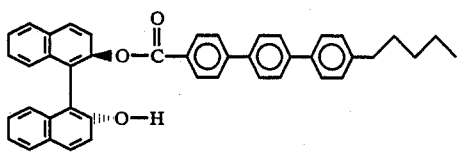
(8)

R-1,1'-Bi-2-naphthol monoester of 4''-n-pentyl-4-terphenylcarboxylic acid

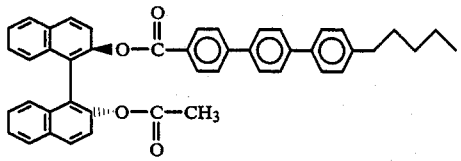
(9)

R-1,1'-bi-2-naphthol diester of 4'-trans-n-pentylcyclohexyl-4-diphenylcarboxylic acid and acetic acid (ethanoic acid)

The compound (5) has a melting point of 139° to 141° C. and the high twisting power (expressed as p·c) at 25° C. is +1.38, the compound (6) has a melting point of 141° to 145° C. and the product p·c. is −5.35; the values for p·c of the compounds (7) and (8) are +1.58 and −5.00; the compound (9), with a melting point of 119°, has a p·c value of +185.

BRIEF DESCRIPTION OF THE DRAWINGS

FIG. 1 is a graph which plots the MTP values as a function of temperature for compounds (1), (3) and (4);

FIG. 2 is a graph which plots the MTP values as a function of temperature for compound (2);

FIG. 3 is a graph which plots the MTP values as a function of temperature for compounds (5) through (9);

EXPLANATORY NOTES RELATING TO DRAWING

In the accompanying drawing the MTP values are plotted as a function of temperature for the above compounds 1 to 9.

MTP ("molecular twisting power"): $\beta = 1/p \cdot N_v$ (p=pitch of the induced helical structure in m, $N_v$=concentration of the chiral admixture in mol/m³).

Figure 4:
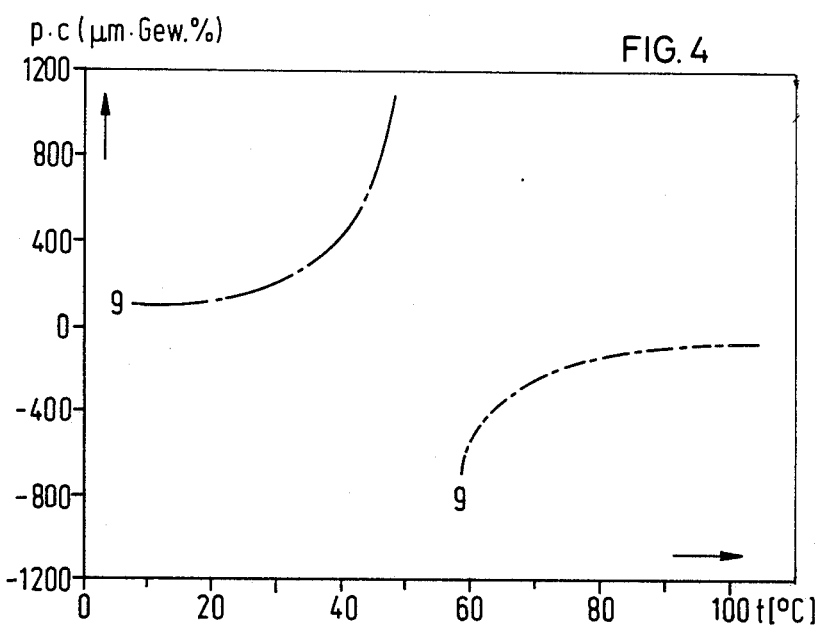
FIG. 4 is a graph which plots the degree of twisting (p·c) as a function of temperature for compound (9)
Figure 5:
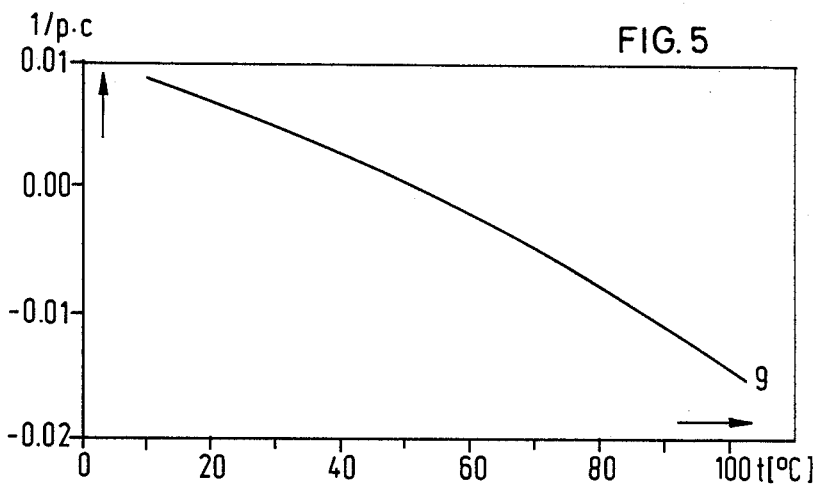
FIG. 5 is a graph which plots the reciprocal of the degree of twisting (1/p·c) as a function of temperature for compound (9).

With a high MTP value (as also in the case of the compounds 3, 4, 5 and 7), the inventive compound 1 exhibits virtually no change in this value (over a certain temperature range) as the temperature increases (FIG. 1 and FIG. 3), which is to be observed in the similar disubstituted derivatives 3, 4, 5 and 7 to a small extent. The monoesters 2, 6 and 8, on the other hand, exhibit a decrease in the MTP values with rising temperature (FIG. 2 and FIG. 3). The compound 9 exhibits helix inversion (see FIGS. 3, 4 and 5).

We claim:

1. A chiral ester of the formula (I)

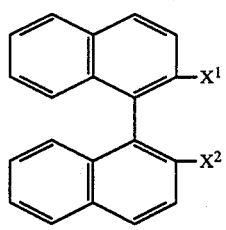
(I)

wherein
X¹ is OH, O—CO—($C_1$ to $C_{12}$)alkyl or O—MC; and
X², independently of X¹, is O—MC;
wherein MC has the formula (II)

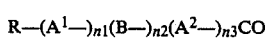
(II)

wherein
R is a straight-chain or branched ($C_1$-$C_{12}$)alkyl, where one or two nonadjacent $CH_2$ groups may be replaced by O atoms;
A¹ and A², independently of each other, are 1,4-phenylene, pyrimidine-2,5-diyl, 1,4-cyclohexylene or 1,3-dioxane-2,5-diyl;
B is CO—O, O—CO, $CH_2$—$CH_2$, $OCH_2$, $CH_2O$, CH=N, N=CH, N=N or N(O)=N; and n2 is 0 or 1; and n3 is 1 or 2; and n1 is 1 or 2 when n2 is 1, or n1 is 0, 1, or 2 when n2 is 0.

2. A chiral ester as claimed in claim 1, wherein in the formula (I)

$X^1$ and $X^2$, independently of each other, are O—MC, and in the formula (II)

R is a straight-chain ($C_4$–$C_{10}$)alkyl, where one $CH_2$ group may be replaced by an O atom;

$A^1$ and $A^2$, independently of each other, are 1-4-phenylene or 1-4-cyclohexylene;

B is CO—O or O—CO;

n1 is 1;
n2 is 0 or 1; and
n3 is 1 or 2.

3. A twistable liquid crystal mixture comprising as a dopant at least one chiral compound of the formula (I) as claimed in claim 1.

4. The liquid crystal mixture as claimed in claim 3, wherein the total amount of chiral compounds of the formula (I) is 0.01 to 70% by weight.

5. A liquid crystal display element containing a liquid crystal mixture as claimed in claim 3.

* * * * *